United States Patent [19]

Treitz

[11] Patent Number: 4,862,736
[45] Date of Patent: Sep. 5, 1989

[54] METHOD AND APPARATUS FOR THE TRANSFER OF FORCES AND/OR MOMENTS IN VEHICLE TESTING

[75] Inventor: Peter-Ludwig Treitz, Darmstadt, Fed. Rep. of Germany

[73] Assignee: Carl Schenck AG, Fed. Rep. of Germany

[21] Appl. No.: 808,872

[22] Filed: Dec. 13, 1985

[30] Foreign Application Priority Data

Dec. 24, 1984 [EP] European Pat. Off. ........ 84116280.3

[51] Int. Cl.[4] .......................................... G01M 15/00
[52] U.S. Cl. .................................................. 73/117
[58] Field of Search ............ 73/117, 126, 116, 862.09, 73/862.12, 130, 127, 862.11, 862.13, 862.08, 131, 865.5, 865.9

[56] References Cited

U.S. PATENT DOCUMENTS

| | | | |
|---|---|---|---|
| 1,525,447 | 2/1925 | Hose | 73/117 |
| 1,568,802 | 1/1926 | Cowdrey | 73/130 |
| 3,898,875 | 8/1975 | Knoop et al. | 73/116 |
| 4,092,855 | 6/1978 | Kinney | 73/862.12 |
| 4,186,593 | 2/1980 | Watanabe | 73/117 |
| 4,196,617 | 4/1980 | Leone, Sr. | 73/862.12 |
| 4,466,294 | 8/1984 | Bennington et al. | 73/116 |

FOREIGN PATENT DOCUMENTS

| | | |
|---|---|---|
| 603714 | 10/1934 | Fed. Rep. of Germany ........ 73/117 |
| 2551067 | 5/1976 | Fed. Rep. of Germany . |
| 3114714 | 10/1982 | Fed. Rep. of Germany . |
| 528474 | 9/1976 | U.S.S.R. ................................. 73/117 |

Primary Examiner—Stewart J. Levy
Assistant Examiner—Robert R. Raevis
Attorney, Agent, or Firm—Connolly and Hutz

[57] ABSTRACT

Through a method for transferring forces and/or moments between a rotatingly powered test stand and a test specimen and through an apparatus for carrying out the method, data is obtained which is identical to actual service data of a vehicle as it is driven on the road. This is accomplished without need to resort to additional empirical factors. The data is obtained by suspension of the mass of the driven test specimen with the test machine and through a torsion elastic connection of the test specimen with the test machine.

8 Claims, 1 Drawing Sheet

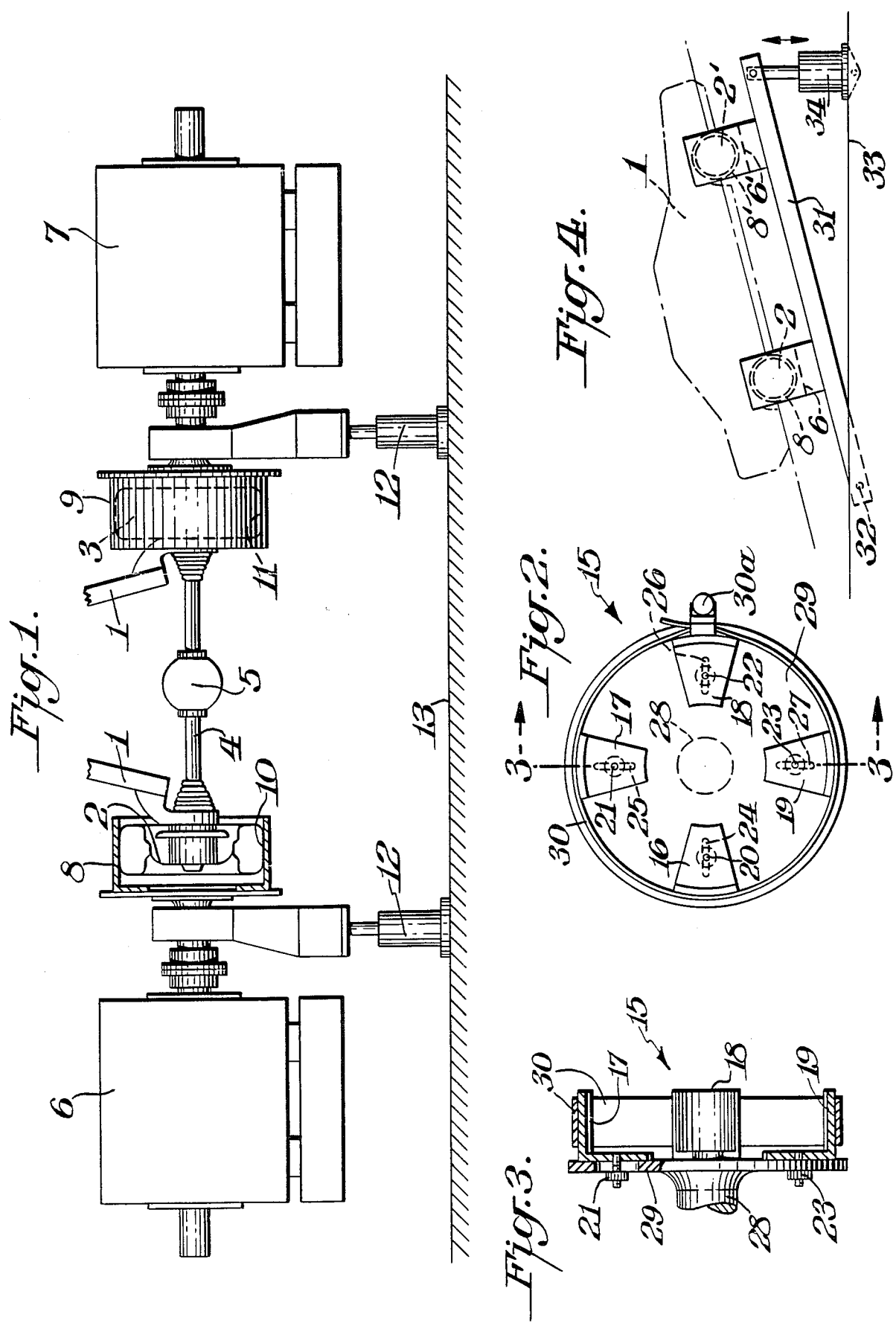

METHOD AND APPARATUS FOR THE TRANSFER OF FORCES AND/OR MOMENTS IN VEHICLE TESTING

BACKGROUND OF THE INVENTION

The present invention relates to a method of transmitting forces and/or moments between a drivable test stand powered from outside and a test specimen, such as a vehicle.

Vehicle or vehicle component test stands are designated according to their intended purpose such as power test stands, brake test stands, transmission test stands or engine test stands, for example. Common to all these test stands is, that the component or system under investigation is connected to a source of mechanical power and also to means for absorbing power, for instance a DC motor which may be used as a generator as well as a drive motor. In cases where the DC motor is used as a generator, the drive system functions as a brake for the forces and moments that emanate from the engine of the component or the engine of the vehicle being investigated. In cases where the DC motor functions as a motor, forces and moments are transferred from the motor to the vehicle drive system.

In order to transfer these forces, an interconnection must be created between the driving or braking machine of the test stand and the motor vehicle and/or other component. Such interconnection enables investigation of the forces and moments which occur during investigation of the vehicle or other component.

Heretofore such interconnection has been accomplished by one or several rolls on which the motor vehicle rests. The rolls are driven, for instance by the wheels of the vehicle, and in turn the rolls drive a DC motor functioning as a generator.

This combination is based on friction and results in many disadvantages. One such disadvantage is that the roll diameters must be different according to the power to be transmitted. The roll diameter or diameters on which the driven wheels of the motor Vehicle rest, must be larger with increasing power, speed and duration of the test. Also, in transmission test stands the power to be measured is that which is transmitted to the road by the vehicle motor transmission, driveshaft and rear axle. Often this power train through its drive axles and wheel axles are connected to drive shafts rather than wheels which in turn are connected to drive/brake means for instance a DC motor.

As means for powering or braking the test stand, hydraulic machines or eddy current brakes may be used instead of electric motor. In transmission test stands, however, the power transmission characteristics which are present with roll test stands are missing. Therefore, additional, partially empirically determined correction factors must be considered and these factors are contained in a control device which simulates vehicle driving resistances such as roll resistance and/or air resistance. This is necessary in order to obtain representative conclusions as to the actual usage conditions of the motor vehicle traveling over the road from the data measured on the test stand.

From German Offenlegungsschrift 3,114,714 an apparatus is known for the testing of wheels of motor vehicles under simulated service conditions whereby the vertical forces and the lateral forces are introduced to the vehicle wheels in a service-like manner by means of servo hydraulic cylinders and by means of a loading device. The vehicle wheel with mounted tire is almost harnessed in a rotatable wheel retainer. Such an apparatus serves the purpose of testing the dynamic characteristics of motor vehicle wheels.

SUMMARY OF THE INVENTION

Accordingly, included among the objects of the present invention are process and apparatus which avoid the disadvantages of the prior art in the transmission of forces between a test stand and a motor vehicle being investigated.

Another object of the invention herein is a process which is carried out in an efficient and reliable manner in the testing of a motor vehicle utilizing test stand apparatus.

Still another object of the invention is an overall apparatus which is easy to use and which functions in a highly reliable manner to produce accurate data relating to the characteristics of the mechanical components of a motor vehicle.

In the method herein, the obtained data is identical with the actual values of a vehicle traveling on a road, and such data is derived without the need for additional empirical correction values. Through the suspension of the test specimen upon the test machine as well as the connection and a fixed relationship between the test specimen and the test stand, test conditions are achieved which closely parallel actual operation of the motor vehicle on the road.

Drive train backlash which occurs when drive shafts are used on transmission test stands is avoided. Also, with the method according to the invention, the total vehicle mass which may be represented on the test stand by inertia weights or may be synthesized by inertia simulators, acts with rotating but otherwise harnessed wheels in the same manner as it does in actual use of the motor vehicle.

Also, with the method according to the invention, the power transmitted by the motor vehicle engine through the power train and the motor vehicle wheels onto the road is transferred in reproducible manner to the test stand machine in those cases where the test stand serves as a brake for the drive train being investigated. In addition, it is possible to superimpose on the test stand machine, using at least one motor vehicle wheel, additional forces and moments which load the motor vehicle power plant and its power train according to driving conditions such as road incline or decline. In the same way, eventualities which normally occur during driving such as cornering, driving uphill or downhill or various loadings resulting from the road surface may be investigated. All of these occurrences produce stresses on the drive train and may cause elastic deformations of drive train such as bending of the rear axle and torsion of the drive shaft. These occurrences can be simulated on a motor vehicle test stand operated according to the inventive method.

Motor vehicle test stands used heretofore, especially test stands for drive trains, exhibit certain movement and play which cannot be measured until the driving structure engages each other in a given direction. At the end of such movement or play shock loads are produced which are detrimental to the test stand machines and to the drive train being investigated especially in those cases where rotational direction is frequently changed. Because of the direct and coaxial orientation in the connection between the test stand and the vehicle being investigated and the use of an inflatable element in that connection, a torsional elastic transmission is achieve between the test stand machine and the motor vehicle or the drive train being investigated. Actual conditions of the components in service are duplicated. Also, there are no failures because of drift, and no additional parameters need be included in the measurements to account for the position of the tire patch line of the rolling tire on the roll of the test stand.

In order to completely simulate the service conditions of the motor vehicles or power trains being investigated, all wheels of the power train are held in coaxially oriented couplings fixed thereto by means of the inflatable tires.

Instead of a separate inflatable element, the car tire itself is used whereby actual service conditions during driving of the motor vehicle are simulated.

Special arrangements of the coaxial components enable adjustment of the diameter of the coaxial coupling to accommodate different size tires. Service conditions at various tire pressures may be simulated utilizing this coupling. Also, as noted, various vehicles with different wheel diameters may be tested on the same test stand.

Through tilting of the vehicle support ramp, the conditions of a power train during uphill and downhill driving can be easily and effectively simulated very well. Also, loading conditions which result from vehicle roll from side-to-side can be simulated in accordance with the invention by side tilting the vehicle on the support ramp. Instead of movement of the entire support ramp, an arrangement is provided whereby loading of rear axles and torsion of the drive shafts which result from the above maneuvers are simulated by additional loading connected to the coupling.

Through the rotatable connection according to the invention of at least one driven wheel all actions and reactions between the road and the engine of the motor vehicle are transmitted at the point of their origin to the test stand or are transmitted to the motor vehicle engine without deviation.

BRIEF DESCRIPTION OF THE DRAWING

Novel features and advantages of the present invention in addition to those mentioned above will become obvious to those skilled in the art from a reading of the following detailed description in conjunction with the accompanying drawing wherein similar reference characters refer to similar parts and in which:

FIG. 1 is an end elevational view of apparatus according to the present invention with certain parts thereof shown in section;

FIG. 2 is a side elevational view of an alternate coupling construction for the apparatus of the present invention;

FIG. 3 is a sectional view taken along line 3—3 of FIG. 2; and

FIG. 4 is a diagrammatic view schematically illustrating the tilting support ramp of the present invention.

DETAILED DESCRIPTION OF THE INVENTION

Referring in more particularity to the drawing, FIG. 1 illustrates a motor vehicle 1 having rear driven wheels 2 and 3 connected to rear axle 4 and differential 5. The differential is connected to a drive shaft (not shown) which in turn is connected to a multiple gear box and vehicle engine (also not shown). Test stands 6 and 7, one on each side of the rear of the vehicle, comprise drive motors arranged for connection to the vehicle wheels 2,3 by couplings 8 and 9. The couplings surround the wheels and engage the tread surface of tires 10,11 secured to the wheels. Frictional contact between the tire tread and the inside surface of couplings 8 and 9 is accomplished by dimensioning the couplings close to the dimensions of the tires and inflation of the tires which stretches them in a radially outward direction against the interior of the couplings. Thus, motor vehicle 1 is rotatably connected to drive motors 6,7 through tires 10,11 and the couplings 8,9.

As a result of the positive connection between the driven vehicle wheels 2,3 and the test stands 7,8 via the couplings 8,9 and tires 10,11, it is possible to introduce given programs for the motor vehicle into the drive motors 6,7 of the test stand. Such programs may represent service conditions which occur during acceleration, deceleration, uphill and downhill driving, and cornering. Also additional influences may be introduced which affect the total drive train of the vehicle consisting of the motor vehicle engine, motor vehicle transmission motor vehicle drive shaft, differential, axles and driven wheels.

A transducer 12 supported by base 13 may be connected to coupling 8 to investigate additional forces which simulate those emanating from the road of the type that cause shocks in the drive train.

FIGS. 2 and 3 show a radially movable coupling 15 wherein four clamping brackets 16,17,18,19 are radially guided by means of studs 20,21,22,23 and radially oriented elongated slots 24,25,26,27 located in support plate 29 fixed to shaft 28 of the drive machines 6 and 7. A compression band 30 embraces outside the tire engaging portion of brackets 16,17,18,19. Such compression band may be shortened or lengthened by means of an adjustment mechanism 30a in order to size the coupling 15 for connection to the driven wheels 2,3 and tires 10,11. The adjustability of the coupling enables connection to the vehicle even in those cases where the tires 10,11 are inflated to pressure levels different from standard. Thus, influences upon vehicle behavior at tire pressures other than the prescribed pressure may be investigated.

FIG. 4 illustrates an adjustable support ramp 31 which may be lifted from base support 33. Specifically, one end of adjustable support ramp 31 is pivotally connected at pivot 32 to base support 33, and a hydraulic cylinder and piston device 34 interconnects the opposite end of adjustable support ramp 31 and the base support. The adjustable support ramp also carries the test stands and couplings. One or more devices 34 may be used to elevate the ramp. The driven wheels 2 and the free wheeling wheels 2' are held in the couplings 8 and 8', respectively. The test stand machines 6,7 function to transfer forces to or receive forces from the motor vehicle. Also, if the drive machines 6,7 act as brakes, then the forces and moments emanating from the engine of the motor vehicle are transferred to the test stands which act as brakes, for example, a DC motor functioning as a generator.

Support ramp 31 may also be rolled or tilted sideways in addition to being tilted in the front-to-back direction. In this regard one side of the support ramp 31 may be elevated relative to the other side by providing lifting devices similar to 34 in the area of pivot 32 and device 34 on one side of the support ramp.

The test stand and its associated coupling may be mounted for transverse shifting movement toward and away from the vehicle being tested.

What is claimed:

1. A method of transferring forces and moments between a test stand and a test specimen in the form of a vehicle having pneumatic tires comprising the steps of providing a test stand having a rotatable shaft and means to rotate the shaft, positioning coupling means at one of the shaft, and suspending the vehicle from the test stand by releasably connecting the coupling means to one of of the pneumatic tires of the vehicle comprising the test specimen.

2. Apparatus for dynamically testing a vehicle having wheels with pneumatic tires comprising a test stand having a rotatable shaft and means to rotate the shaft, and coupling means secured to one end of the shaft constructed and arranged for releaseable attachment to one of the pneumatic tires of the vehicle being tested for suspending the vehicle from the test stand whereby the rotatable shaft of the test stand and such driven vehicle tire rotate in unison with one another.

3. Apparatus as in claim 2 wherein the coupling means includes tire tread engaging portions constructed and arranged to frictionally engage the pneumatic tire of the vehicle wheel connected to the test stand at the tread of the tire.

4. Apparatus as in claim 2 including a test stand for each wheel of the vehicle being tested, each test stand having a rotatable shaft and means to rotate the shaft, and coupling means secured to one end of each shaft constructed and arranged for releasable attachment to the pneumatic tires of each of the vehicle wheels.

5. Apparatus as in claim 2 wherein the coupling means comprises a plurality of spaced apart clamping elements arranged in a circle, each clamping element having a tire tread engaging portion constructed and arranged to frictionally engage the pneumatic tire of the vehicle wheel connected to the test stand at the tread of the tire.

6. Apparatus as in claim 5 wherein the coupling means has an axis of rotation and the clamping elements include adjustable connections for radial movement of the clamping elements toward and away from the axis of rotation of the coupling means.

7. Apparatus as in claim 2 including a support means for the test stand and the vehicle being tested, and means to transversely shift the test stand and its associated coupling means toward and away from a vehicle on the support means.

8. Apparatus as in claim 7 wherein the support means includes a vehicle ramp, and means to tilt the support means including the vehicle ramp.

* * * * *

UNITED STATES PATENT AND TRADEMARK OFFICE
CERTIFICATE OF CORRECTION

PATENT NO. : 4,862,736

DATED : September 5, 1989

INVENTOR(S) : Peter-Ludwig Treitz

It is certified that error appears in the above-identified patent and that said Letters Patent is hereby corrected as shown below:

In column 5, line 10, after "one" insert -- end --.

Signed and Sealed this

Twenty-first Day of August, 1990

*Attest:*

HARRY F. MANBECK, JR.

*Attesting Officer*  *Commissioner of Patents and Trademarks*